Jan. 11, 1938.    W. L. SCRIBNER    2,105,013
ROLLER BEARING CAGE
Filed Nov. 7, 1936

INVENTOR:
William L. Scribner,
by Carr Kerr & Gravely,
HIS ATTORNEYS

Patented Jan. 11, 1938

2,105,013

UNITED STATES PATENT OFFICE 2,105,013

ROLLER BEARING CAGE

William L. Scribner, Canton, Ohio, assignor to The Timken Roller Bearing Company, Canton, Ohio, a corporation of Ohio Application November 7, 1936, Serial No. 109,636

7 Claims. (Cl. 308—217)

This invention relates to one-piece roller bearing cages of the kind used for holding the rollers in proper assembled relation on the ribbed inner or outer raceway of the bearing. Such an assembly requires that the bridges that form the sides of the pockets for the rollers be bent radially of the cake to permit the rollers to clear the thrust rib of the raceway member and then bent back into their normal position to prevent disassembly of said cage, rollers and raceway member. Such bending operations require the use of special bending fixtures and pockets that are larger than necessary and are liable to permanently distort the metal. The object of the present invention is to provide a strong, durable and inexpensive cage that will overcome the above disadvantages. The invention consists in separating one end of the alternate bridges from the cage, whereby such bridges are adapted to spring radially of the cage far enough to permit the rollers on opposite sides thereof to clear the rib on the raceway member on which said cage and rollers are being assembled.

In the accompanying drawing, which forms part of this specification and wherein like symbols refer to like parts wherever they occur, Fig. 1 is a view of a cage, roller and inner raceway assembly provided with a cage embodying my invention, the parts being shown partly in side elevation and partly in section;

Figure 1:
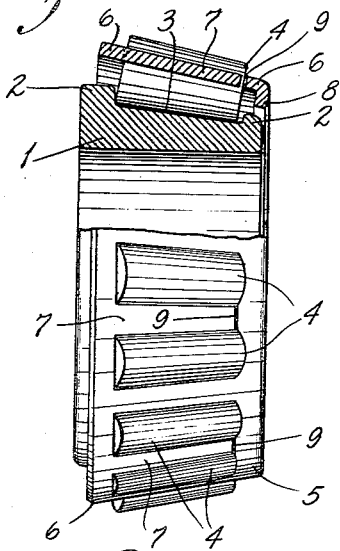
Figure 2:
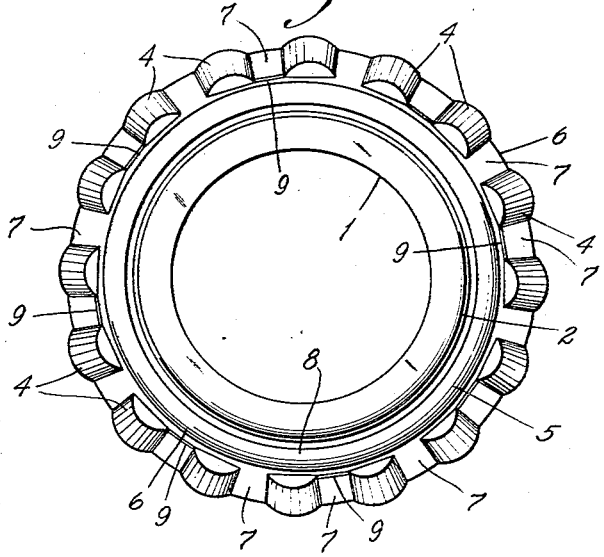
Fig. 2 is an end view of the assembly shown in Fig. 1.

The construction shown in Figs. 1 and 2 comprises a cone or inner bearing member 1 provided with ribs 2 at the ends of the raceway surface 3 thereof, a series of conical bearing rollers 4 mounted on said raceway and a one-piece conical cage 5 for spacing said rollers apart and for retaining them on said cone or inner bearing member. The conical cage 5 comprises end rings 6 and circumferentially spaced bridges 7 that form pockets for the rollers, said bridges being disposed outwardly beyond the cone defined by the axes of the rollers 4 so as to prevent the rollers from moving radially outward. The small end ring 6 is preferably provided with an inturned flange 8.

The cage 5 is provided with an even number of pockets, and alternate bridges of said cage are separated, as at 9, by shearing or punch-slotting, from the small end ring 7 so that said bridges are adapted to spring radially outward. In assembling the rollers and cage on the cone, the assembled rollers are forced endwise over the thrust rib at the small end of the cone and thus spring the severed bridges outwardly far enough to permit the rollers to clear said rib and seat in the raceway; whereupon the bridges are relieved of such outward pressure and spring back into normal position where they operate to hold the rollers on the cone.

Figure 3:
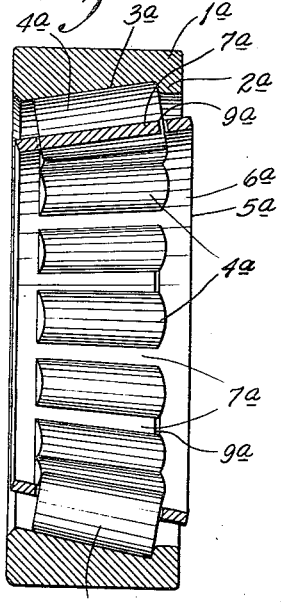
Fig. 3 is a view similar to Fig. 1 showing the invention embodied in a cage, roller and ribbed outer raceway assembly.
Figure 4:
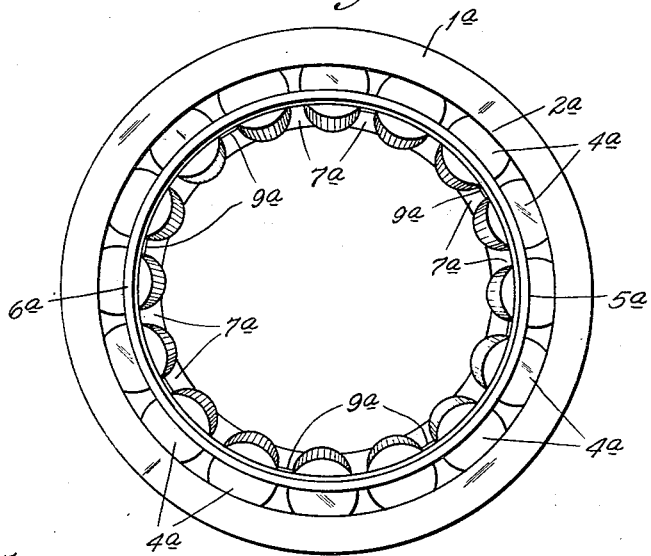
Fig. 4 is an end view of the assembly shown in Fig. 3.

In the roller, cage and outer raceway assembly shown in Figs. 3 and 4, the cup or outer raceway member 1a is provided at the large end of its conical raceway surface 3a with a thrust rib 2a, the bridges 7a of the conical cage 5a are disposed inwardly of the cone defined by the axes of the bearing rollers 4a so as to prevent said rollers from moving radially inwardly, and every other one of said bridges is severed, as at 9a, from the ring 6a at the large end of said cage. In assembling the parts, the severed bridges are forced inwardly when the rollers are moved endwise over the thrust rib of the cup; and, after the large ends of the rollers clear said rib, said bridges spring outwardly into normal position and thus prevent disassembly of the cup, cage and rollers.

Figure 5:
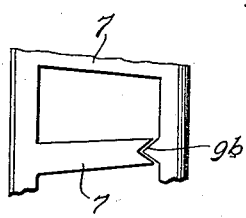
Fig. 5 is a fragmentary view of a cage having its bridge severed from its end ring by a cut that prevents relative circumferential movement of said bridge and end ring.

As shown in Fig. 5, the cuts 9b that separate the bridges of the cage from one of the end rings thereof may be in the form of a V or any other shape that will prevent relative circumferential movement of said bridges and said end ring.

The hereinbefore described cage has several advantages. The roller receiving pockets in the cage may be made to accurately fit the rolls, thereby eliminating any objectionable looseness or play in the assembled raceway member, cage and rollers; and the parts may be assembled by hand or with a relatively light press. The shearing of alternate bridges from one of the end rings of the cage permits these bridges to spring radially of the cage far enough to permit the rollers to clear the thrust rib of the raceway member; and the resiliency of the metal causes the bridges to return to normal position after the rollers clear the rib without distorting the metal and without the use of closing-in fixtures.

What I claim is:

1. A roller bearing cage comprising end rings connected solely by a single series of circumferentially spaced bridges that define pockets for bearing rollers, alternate bridges being free of one of said end rings, whereby such bridges are adapted to spring radially out of normal position to facilitate assembly of said cage and rollers and a ribbed raceway member and to spring back to normal position after such assembly.

2. A conical roller bearing cage comprising end rings connected solely by a single series of circumferentially spaced wingless bridges that define pockets for conical bearing rollers, said pockets being of less width than the diameter of said rollers, alternate bridges being free of one of said end rings, whereby such bridges are adapted to spring radially out of normal position to facilitate assembly of said conical cage and rollers and a ribbed conical raceway member.

3. A roller bearing cage comprising end rings connected solely by a single series of circumferentially spaced bridges that define pockets for bearing rollers, alternate bridges being severed from one end ring, whereby such bridges are adapted to spring radially out of normal position to facilitate assembly of said cage and rollers and a ribbed raceway member, the cuts between severed bridges and said end ring being shaped to prevent relative circumferential movement of said severed bridges and said end ring.

4. A roller bearing cage comprising end rings connected solely by a single series of circumferentially spaced bridges that define pockets for bearing rollers, alternate bridges being severed from one of said end rings, whereby such severed bridges are adapted to spring radially of said cage out of normal position to facilitate assembly of said cage and rollers and a ribbed raceway member, the cut between said severed bridges and said end ring being substantially V-shaped.

5. A roller bearing assembly comprising a member having a raceway with a thrust rib at one end thereof, a series of bearing rollers cooperating with said raceways and a cage comprising end rings connected solely by a single series of circumferentially spaced bridges that define pockets for the bearing rollers and retain said rollers on said raceway, alternate bridges being free of one of said end rings whereby such bridges are adapted to spring radially out of normal position to facilitate assembly of said cage, rollers and ribbed raceway member.

6. A roller bearing assembly comprising an inner raceway member having an external thrust rib at one end of its raceway, bearing rollers cooperating with said raceway, and a cage comprising end rings connected solely by a single series of circumferentially spaced bridges that define pockets for the bearing rollers, alternate bridges being free of one of said end rings, whereby such bridges are adapted to spring radially outward to facilitate assembly of said cage, rollers and ribbed inner raceway member.

7. A roller bearing assembly comprising an outer raceway member having an internal thrust rib at one end of its raceway, bearing rollers cooperating with said raceway, and a cage comprising end rings connected solely by a single series of circumferentially spaced bridges that define pockets for the bearing rollers, alternate bridges being free of one of said end rings, whereby such bridges are adapted to spring radially inward to facilitate assembly of said cage, rollers and ribbed inner raceway member.

WILLIAM L. SCRIBNER.